(12) United States Patent
Komoda

(10) Patent No.: US 10,551,647 B2
(45) Date of Patent: Feb. 4, 2020

(54) ATTACHMENT DEVICE FOR DISPLAY PANEL AND ATTACHMENT METHOD

(71) Applicant: CLIMB PRODUCTS CO., LTD., Osaka-shi, Osaka (JP)

(72) Inventor: Daisuke Komoda, Osaka (JP)

(73) Assignee: CLIMB PRODUCTS CO., LTD., Osaka-shi, Osaka (JP)

( * ) Notice: Subject to any disclaimer, the term of this patent is extended or adjusted under 35 U.S.C. 154(b) by 396 days.

(21) Appl. No.: 15/310,376

(22) PCT Filed: Sep. 17, 2015

(86) PCT No.: PCT/JP2015/076455
§ 371 (c)(1),
(2) Date: Nov. 10, 2016

(87) PCT Pub. No.: WO2016/132582
PCT Pub. Date: Aug. 25, 2016

(65) Prior Publication Data
US 2017/0269397 A1    Sep. 21, 2017

(30) Foreign Application Priority Data

Feb. 17, 2015 (JP) .................................. 2015-028545

(51) Int. Cl.
*G02F 1/13*   (2006.01)
*B29C 65/48*  (2006.01)
(Continued)

(52) U.S. Cl.
CPC ............ *G02F 1/1303* (2013.01); *B29C 65/48* (2013.01); *B29C 66/00145* (2013.01); *B29L 2031/34* (2013.01); *G02F 1/13338* (2013.01)

(58) Field of Classification Search
CPC .............. G02F 1/1303; G02F 2202/28; G02F 1/13338; B29C 66/00145; B29C 65/48;
(Continued)

(56) References Cited

U.S. PATENT DOCUMENTS

| 8,419,496 | B1* | 4/2013 | Smith | .................. G02F 1/1333 445/25 |
| 2004/0095548 | A1* | 5/2004 | Lim | ...................... G02F 1/1339 349/187 |

(Continued)

FOREIGN PATENT DOCUMENTS

| JP | 2011-026143 A | 2/2011 |
| JP | 5062897 B | 10/2012 |
| KR | 101331872 B1 * | 11/2013 |

OTHER PUBLICATIONS

KR-101331872-B1 Machine Translation of Description.*
International Search Report for PCT/JP2015/076455.
Written Opinion for PCT/JP2015/076455.

*Primary Examiner* — Christopher T Schatz
*Assistant Examiner* — Cynthia L Schaller
(74) *Attorney, Agent, or Firm* — Muncy, Geissler, Olds & Lowe, P.C.

(57) ABSTRACT

The present invention is to provide an attachment device of a display panel capable of, while solving enclosure of bubbles in an attachment surface at the time of attachment, reliably removing bubbles generated even after attachment, and remarkably lowering a defectiveness ratio of an attachment body to improve productivity of attachment tasks. A vacuum chamber unit 3 is formed by a chamber main body 10 and a chamber lid body 11. A fixed attachment base 12 including a dam jig 13 is provided in an interior of the chamber main body 10, and a movable attachment base 16 is provided in an interior of the chamber lid body 11. After a display panel P1 and an object to be attached P2 loaded to (Continued)

the dam jig 13 and the movable attachment base 16 are attached under a vacuum environment, the vacuum chamber unit 3 is brought into an inclined posture by a chamber inclination device, a non-sealed portion 34 not sealed by the dam jig 13 is placed at an inclination upper end of the display panel P1, and bubbles generated on an attachment surface in a process of hardening an adhesive are removed from the non-sealed portion 34.

17 Claims, 10 Drawing Sheets

(51) Int. Cl.
*B29C 65/00* (2006.01)
*B29L 31/34* (2006.01)
*G02F 1/1333* (2006.01)

(58) Field of Classification Search
CPC ..... G09F 9/00; B29L 2031/34; C03B 23/245; C03C 27/06; Y02P 40/57
See application file for complete search history.

(56) References Cited

U.S. PATENT DOCUMENTS

| | | | |
|---|---|---|---|
| 2012/0037317 A1* | 2/2012 | Han | B32B 38/1841 156/378 |
| 2015/0037593 A1* | 2/2015 | Chan | B32B 37/12 428/426 |
| 2016/0214364 A1* | 7/2016 | Yamashita | G02F 1/133308 |

* cited by examiner

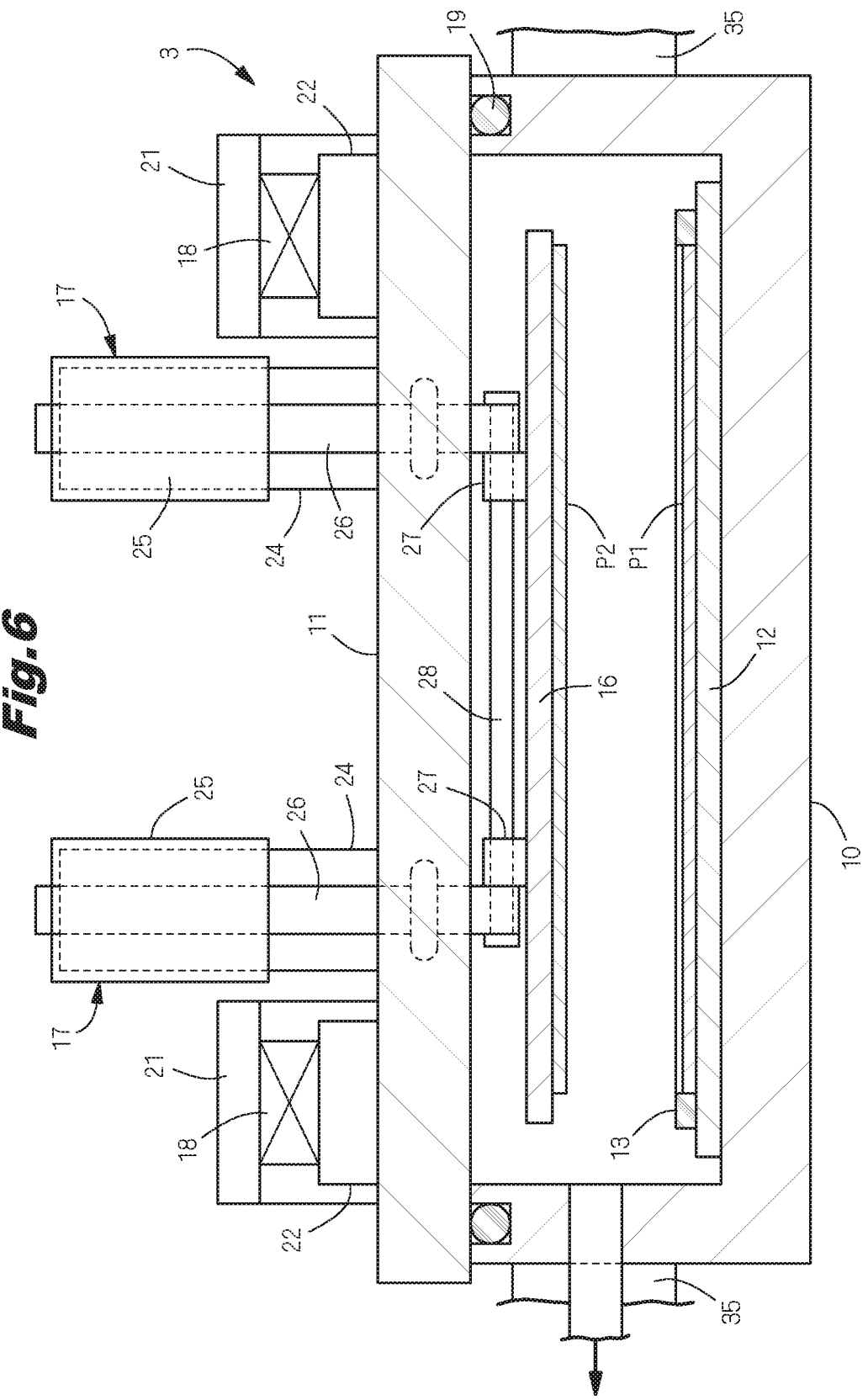

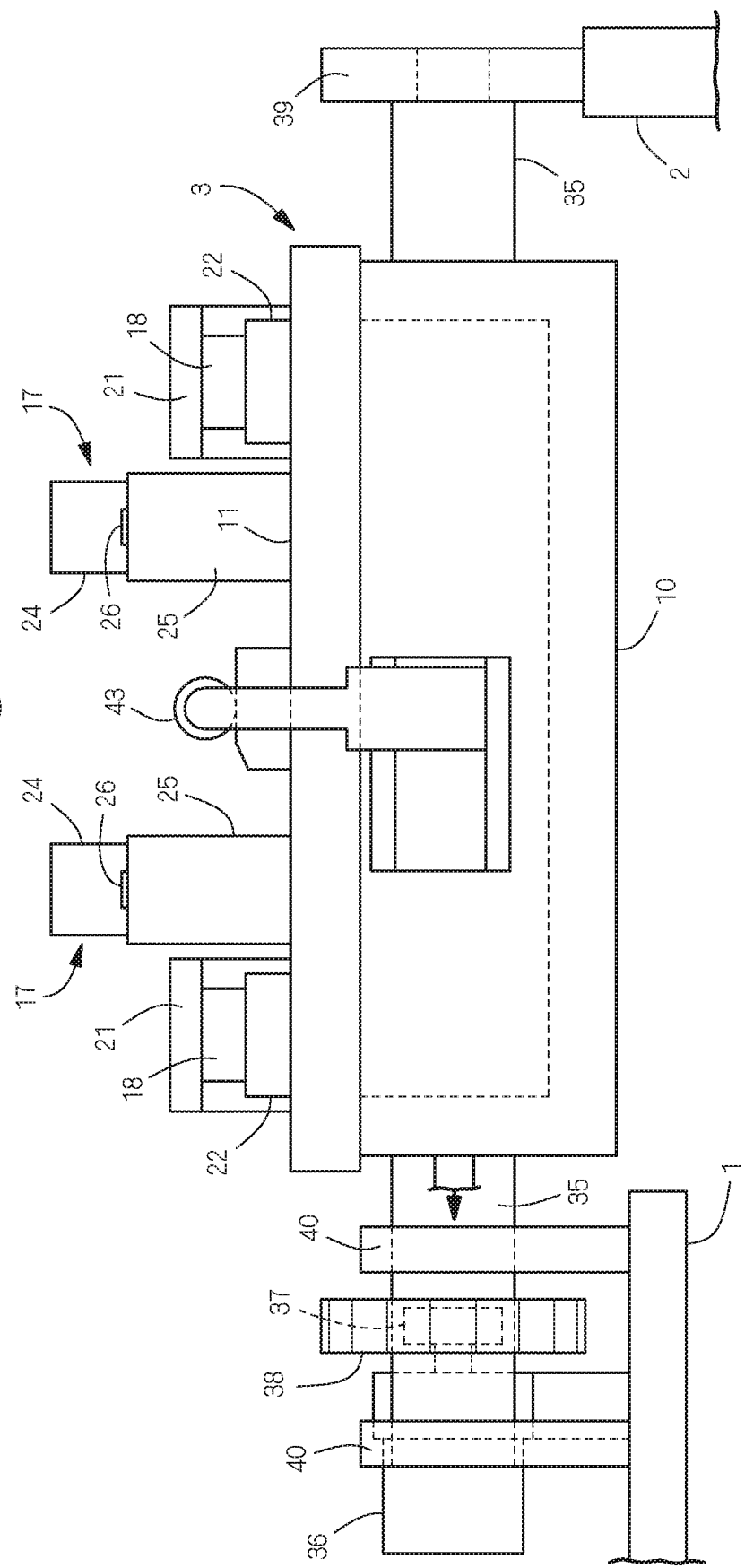

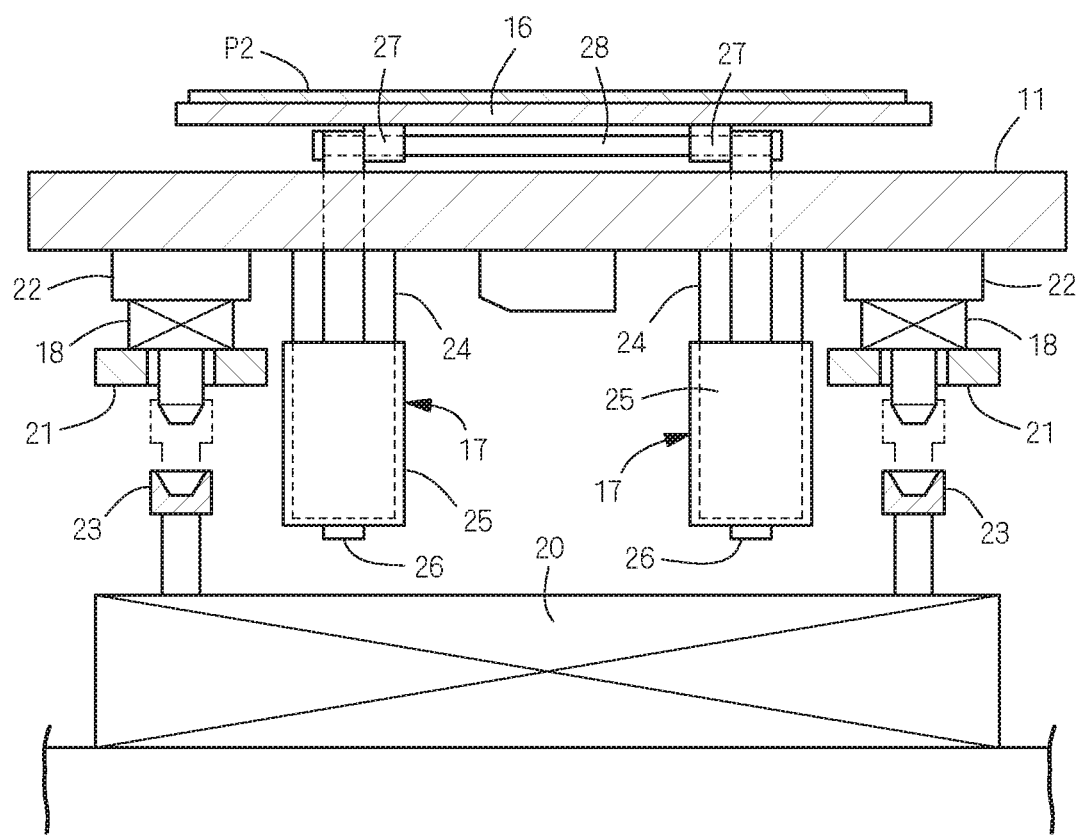

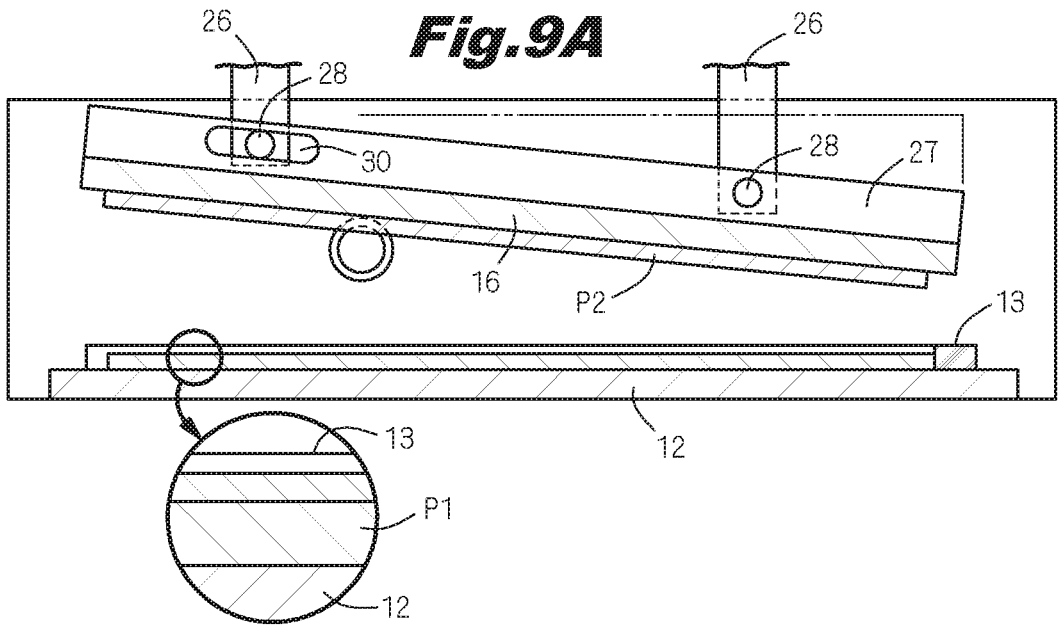
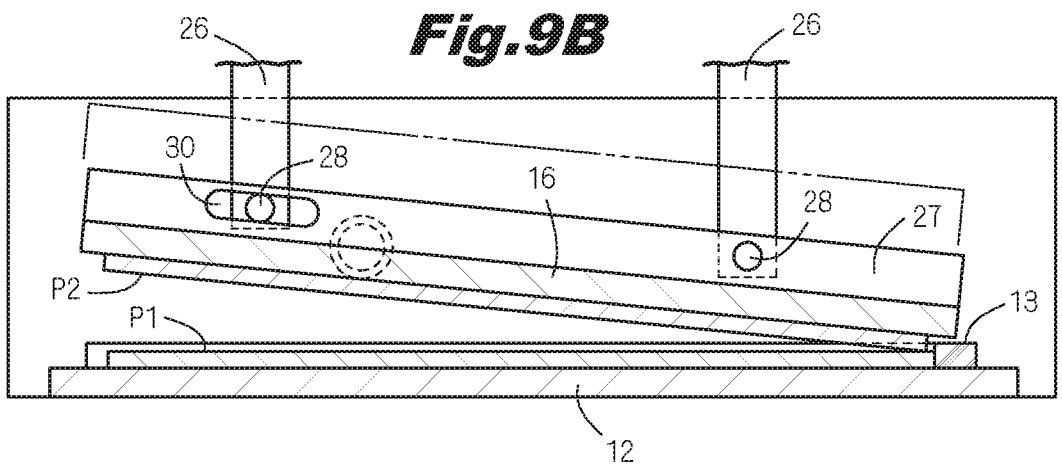
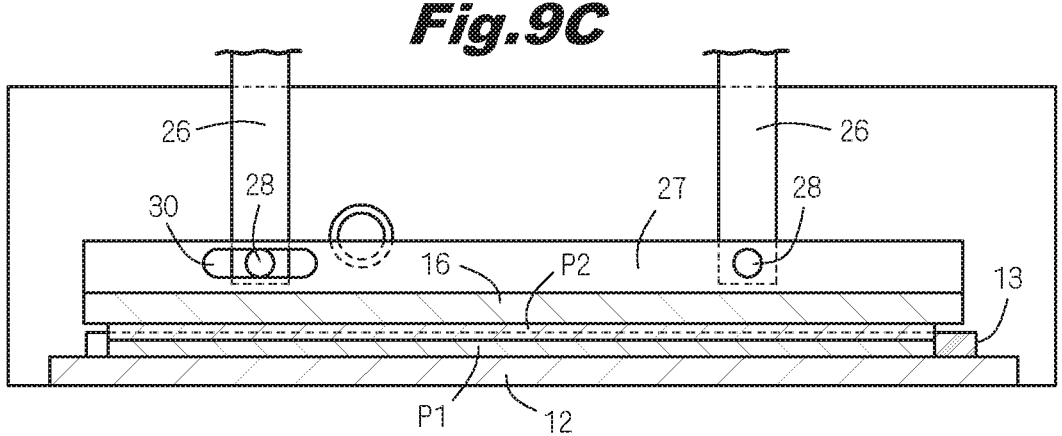

ATTACHMENT DEVICE FOR DISPLAY PANEL AND ATTACHMENT METHOD

TECHNICAL FIELD

The present invention relates to an attachment device and an attachment method for attaching a display panel such as a liquid crystal panel and a touch panel to an object to be attached. There is sometimes a case where a liquid crystal panel is attached to a touch panel serving as the object to be attached.

BACKGROUND ART

In an attachment device according to the present invention, a display panel accommodated in a vacuum chamber and an object to be attached are attached under a vacuum environment. This type of attachment device is disclosed in Patent Document 1 already proposed by the present applicant. In the document, in an interior of a vacuum chamber, a table supporting a work holder, an attachment diaphragm, a table drive structure that operates and presses the table toward the attachment diaphragm, and the like are provided. The work holder includes an attachment base supporting a first work, and a work holding structure supporting a second work in a state where the second work has a predetermined gap from the first work. At the time of attachment, an adhesive material is applied to an attachment surface of any one of both the works, the air in the vacuum chamber is exhausted, and in a state where a diaphragm film of the attachment diaphragm is expanded and deformed, the table is operated and pressed onto the attachment diaphragm and the second work is attached to the first work from a center part toward a peripheral part.

In the attachment device of the present invention, the vacuum chamber is rotated and moved between a plurality of stages, and different attachment processing is performed on the stages at the same time to improve productivity of an attachment body. Such an attachment device is disclosed in Patent Document 2 proposed by the present applicant. In the document, first and second rotation bases each including four adsorption surfaces are arranged adjacently up and down, and the adsorption surfaces face each other while having predetermined attachment gaps. First to fourth stages on which different attachment processing are respectively performed are provided around both the rotation bases. The rotation bases are rotated by 90 degrees, and a first work and a second work adsorbed onto the adsorption surfaces are set on the stages, so that the attachment processing is performed. On the stages, supply of the works and ejection of the attached works, exfoliation of a protection paper, positioning of both the works, and attachment of the works are performed.

PRIOR ART DOCUMENT

Patent Document

Patent Document 1: JP 5062897 B1 ([0033] to [0034], FIG. 1)
Patent Document 2: JP 2011-26143 A ([0046] to [0048], FIG. 1)

SUMMARY OF THE INVENTION

Problems to be Solved by the Invention

In a case where the work and the object to be attached are attached, an adhesive is applied to a surface of the work such as the display panel, or a surface of the object to be attached. However, in a case where the adhesive is applied in the atmosphere, minute air bubbles are unavoidably contained in an adhesive layer. Therefore, at the time of attaching the work and the object to be attached under the vacuum environment, the air contained in the adhesive layer is separated from the adhesive layer and bubbles are generated on an attachment surface, so that bonding defectiveness is easily caused. In a process of hardening the adhesive, a solvent contained in the adhesive is volatilized and bubbles are formed on the attachment surface. Thus, the bonding defectiveness is easily caused. Regarding prevention of generation of such bubbles, as in the attachment device of Patent Document 1, when the second work is attached to the first work from the center part toward the peripheral part under the vacuum environment, bubbles generated on the attachment surface can be discharged while being pressed from the center part toward the peripheral part. Thus, bubbles can be suppressed from remaining on the attachment surface. However, depending on the adhesive, bubbles of a solvent may sometimes be generated in a period from an end of attachment of the work and the object to be attached to an end of hardening. Since bubbles are particularly easily generated under the vacuum environment, a large barrier to lowering a defectiveness ratio of the attachment body is caused.

The present inventor sought the above attachment device that performs attachment while forcibly discharging bubbles from a center part toward a peripheral part as a matter of course, and a method of attachment processing with which bubbles do not remain on an attachment surface by using a newly experimentally produced attachment device. In particular, regarding generation of bubbles after attachment, the inventor examined how bubbles could be removed, and through repeated trial and error, reached an idea to come to the gist of the present invention, and finally proposed the present invention.

An object of the present invention is to provide an attachment device of a display panel and an attachment method capable of, while solving enclosure of bubbles in an attachment surface at the time of attachment, reliably discharging bubbles generated even after attachment, and therefore remarkably lowering a defectiveness ratio of an attachment body to improve productivity of attachment tasks.

Means for Solving the Problems

An attachment device of a display panel according to the present invention includes a vacuum chamber unit 3, and a vacuum source that exhausts the air in the vacuum chamber unit 3. The vacuum chamber unit 3 is formed by a chamber main body 10 and a chamber lid body 11, a fixed attachment base 12 including a dam jig 13 is provided in an interior of the chamber main body 10, and a movable attachment base 16 is provided in the chamber lid body 11. The dam jig 13 is installed for sealing a large part of a peripheral surface of a display panel P1 to prevent flowing and diffusion of an adhesive applied to the display panel P1, and a non-sealed portion 34 is exposed in a peripheral part of the display panel P1 not in contact with the dam jig 13. Under a vacuum environment where the chamber lid body 11 is closed and the air in the vacuum chamber unit 3 is exhausted by the vacuum source, the movable attachment base 16 is pressed toward the fixed attachment base 12 and an object to be attached P2 is attached to the display panel P1. While under the vacuum environment where the display panel P1 and the object to be attached P2 are attached, the vacuum chamber unit 3 is brought into a standing posture by a chamber inclination device, the non-sealed portion 34 is placed at a standing upper end of the display panel P1, and bubbles generated on an attachment surface in a process of hardening the adhesive are removed from the non-sealed portion 34.

Attachment units 17 that press the movable attachment base 16 toward the fixed attachment base 12, and positioning structures 18 movably supporting the movable attachment base 16 to position the object to be attached P2 with respect to the display panel P1 loaded to the dam jig 13 are provided in the chamber lid body 11. In a state where the chamber lid body 11 is opened, alignment bases 22 of the positioning structures 18 are driven and adjusted by an alignment structure 20 to position the display panel P1 and the object to be attached P2.

A plurality of vacuum chamber units 3 is arranged at equal intervals in the circumferential direction of a rotation table 1. A preparation stage on which after an attachment body is ejected from the vacuum chamber unit 3, the display panel P1 and the object to be attached P2 are loaded to the vacuum chamber unit 3 and the adhesive is applied to the display panel P1 by a dispenser 5 is provided around the rotation table 1. A different one of the vacuum chamber units 3 is set on the preparation stage by forward moving or reversely moving the rotation table 1 by a table drive structure. The vacuum chamber unit 3 not placed on the preparation stage is brought into an inclined posture by the chamber inclination device, and bubbles generated on the attachment surface are removed.

As shown in FIG. 2, three vacuum chamber units 3 are arranged at equal intervals in the circumferential direction on the rotation table 1. After two different vacuum chamber units 3 are individually set on the preparation stage by forward rotating the rotation table 1 by 120 degrees, the remaining vacuum chamber unit 3 is set on the preparation stage by reversely rotating the rotation table 1 by 240 degrees. The object to be attached P2 is attached to the display panel P1 by one of the two vacuum chamber units 3 not set on the preparation stage, the remaining vacuum chamber 3 is brought into an inclined posture by the chamber inclination device, and bubbles generated on the attachment surface are removed.

The positioning structures 18 are provided in lid support frames 21 to be oscillated and opened/closed with respect to the chamber main body 10, and the chamber lid body 11 is loaded to the alignment bases 22 of the positioning structures 18. The alignment structure 20 that drives and adjusts the alignment bases 22 is arranged in the preparation stage. The attachment units 17 include guide frames 24 fixed to the alignment bases 22, a plurality of sliders 25 upward/downward movably guided and supported by the guide frames 24, a drive mechanism that drives and slides the sliders 25 upward/downward, and a plurality of attachment shafts 26 that reciprocate and slide together with upward/downward movement of the sliders 25. The attachment shafts 26 pass through an interior and an exterior of the chamber lid body 11, and shaft ends of the attachment shafts are coupled to an upper part of the movable attachment base 16 in the interior of the chamber lid body 11. Parts between through holes of the chamber lid body 11 and the attachment shafts 26 are sealed by seal bodies 29 in such a manner that no air ventilation is allowed. In a state where the chamber lid body 11 is closed and an interior of the vacuum chamber unit 3 is vacuum, the sliders 25 are driven and slid by the drive mechanism, and in a state where the movable attachment base 16 is inclined in non-parallel to the fixed attachment base 12 as shown in FIG. 8, attachment of the object to be attached P2 and the display panel P1 is started. While gradually decreasing an inclination angle of the movable attachment base 16 from an attachment start end to an attachment terminal end, the object to be attached P2 and the display panel P1 are attached.

A heating body 33 that facilitates hardening of the thermosetting adhesive is arranged in an interior of the dam jig 13.

The display panel P1 is formed into a square shape, three sides around the display panel are sealed by the dam jig 13, and the non-sealed portion 34 is exposed in the remaining side part.

In an attachment method of a display panel according to the present invention, a display panel P1 accommodated in a vacuum chamber unit 3 and an object to be attached P2 are attached under a vacuum environment. In detail, the attachment method includes a step of opening a chamber lid body 11 of the vacuum chamber unit 3, loading the display panel P1 to a dam jig 13 provided in a fixed attachment base 12 which is provided in an interior of a chamber main body 10, and loading the object to be attached P2 to a movable attachment base 16 provided in an interior of the chamber lid body 11, a step of applying an adhesive to the display panel P1 by a dispenser 5, a step of driving and adjusting alignment bases 22 supporting the chamber lid body 11 by an alignment structure 20 to position the display panel P1 and the object to be attached P2, a step of closing the chamber lid body 11, under the vacuum environment where the air in the vacuum chamber unit 3 is exhausted, pressing the movable attachment base 16 onto the fixed attachment base 12, and attaching the object to be attached P2 to the display panel P1, and a step of bringing the entire vacuum chamber unit 3 into an inclined posture by a chamber inclination device, and removing bubbles generated on an attachment surface while a vacuum state is maintained. In the step of loading the display panel P1 to the dam jig 13, a large part of a peripheral surface of the display panel P1 is sealed by the dam jig 13 to prevent flowing and diffusion of the adhesive applied to the display panel P1, and a non-sealed portion 34 is exposed in a peripheral part of the display panel P1 not in contact with the dam jig 13. In the step of removing bubbles, the non-sealed portion 34 is placed at an inclination upper end of the display panel P1, and bubbles generated on the attachment surface are discharged from the non-sealed portion 34.

In the above attachment method, a plurality of vacuum chamber units 3 is arranged in a rotation table 1, and a preparation stage on which the display panel P1 and the object to be attached P2 are supplied to the vacuum chamber unit 3, an attachment body after attachment is ejected from the vacuum chamber unit 3, and the adhesive is applied to the display panel P1 is provided around the rotation table 1. The vacuum chamber units 3 are placed on the preparation stage one by one by forward rotating the rotation table 1 by a predetermined angle and further reversely rotating the rotation table 1 by the rotation angle at the time of forward rotation. The vacuum chamber unit 3 not placed on the preparation stage is brought into an inclined posture by the chamber inclination device, and bubbles generated on the attachment surface are removed.

Effect of the Invention

In the attachment device according to the present invention, after the object to be attached P2 is attached to the display panel P1 under the vacuum environment, while maintaining the vacuum environment, the vacuum chamber unit 3 is brought into a standing posture, the non-sealed portion 34 is placed at the standing upper end of the display panel P1, and bubbles generated on the attachment surface in the process of hardening the adhesive are removed from the non-sealed portion 34. In such a way, in the attachment device of the present invention, air removing processing is performed under the vacuum environment, and bubbles of a volatile gas and the air generated after attachment are brought to flow upward along a not-yet-hardened adhesive layer, and emitted from the non-sealed portion 34. Thus, there is no space for bubbles to remain on the attachment surface, and a defectiveness ratio of the attachment body can be remarkably lowered to improve productivity of attachment tasks.

The attachment units 17 and the positioning structures 18 are provided in the chamber lid body 11, and the alignment bases 22 of the same structures 18 are driven and adjusted by the alignment structure 20 to position the display panel P1 and the object to be attached P2. Thus, there is no need for providing the alignment structure 20 in the chamber lid body 11. Therefore, a structure of the chamber lid body 11 can be simplified to be lightweight. Thus, a drive load when the vacuum chamber unit 3 stands up can be reduced.

With the attachment device in which the plurality of vacuum chamber units 3 is arranged at equal intervals in the circumferential direction of the rotation table 1, and the preparation stage is provided in the vicinity of one of the vacuum chamber units 3, a different one of the vacuum chamber units 3 can be set on the preparation stage by forward moving or reversely moving the rotation table 1 by a table drive structure. With respect to the vacuum chamber unit 3 set on the preparation stage, ejection of the attachment body, loading of a new display panel P1 and an object to be attached P2, and application of the adhesive by the dispenser 5 can be performed. In the vacuum chamber unit 3 not placed on the preparation stage, the same unit 3 can be brought into an inclined posture by the chamber inclination device, and bubbles generated on the attachment surface can be removed. Therefore, while a preparation task is performed on the preparation stage, an air removing task can be performed in parallel in the vacuum chamber unit 3 not placed on the preparation stage. Thus, a series of attachment tasks can be performed for a shorter time to further improve the productivity of the attachment tasks.

With the attachment device in which the three vacuum chamber units 3 are arranged at equal intervals on the rotation table 1, while the preparation task is performed on the preparation stage, the object to be attached P2 is attached to the display panel P1, and further, the vacuum chamber 3 is brought into an inclined posture by the chamber inclination device, and bubbles generated on the attachment surface can be removed. In such a way, when the preparation task, the attachment task, and the air removing task are performed in parallel at the same time, a series of attachment tasks can be performed for a further shorter time to further improve the productivity of the attachment tasks. Each of the three vacuum chamber units 3 is set on the preparation stage, an attachment stage, and an air removing stage by forward rotating the rotation table 1 by 120 degrees and then reversely rotating the rotation table 1 by 240 degrees, and attachment processing is performed. Thus, a structure of the table drive structure, a wiring structure, and a piping structure can be simplified to reduce the whole cost of the attachment device.

The alignment devices 18 are provided in the lid support frames 21 and the chamber lid body 11 is loaded to the alignment bases 22 of the alignment devices 18. This is to adjust and move the object to be attached P2 loaded to the movable attachment base 16 together with the chamber lid body 11 to align the object to be attached with respect to the display panel P1. The attachment units 17 are formed by the guide frames 24 fixed to the alignment bases 22, the plurality of sliders 25 guided and supported by the guide frames 24, the drive mechanism of the sliders 25, and the plurality of attachment shafts 26 that move together with the sliders 25. This is to attach the object to be attached P2 to the display panel P1 in an inclined state. Specifically, in a state where the movable attachment base 16 is inclined in non-parallel to the fixed attachment base 12, attachment of the object to be attached P2 and the display panel P1 is started. Further, while gradually decreasing the inclination angle of the movable attachment base 16 from the attachment start end to the attachment terminal end, the object to be attached P2 and the display panel P1 are attached. In such a way, when the object to be attached P2 is attached to the display panel P1 while gradually decreasing inclination of the movable attachment base 16 from the attachment start end to the attachment terminal end, attachment can be performed while pressing the minute air contained in the adhesive toward the attachment terminal end. Thus, enclosure of bubbles in the attachment surface at the time of attachment can be solved.

When the heating body 33 is arranged in the interior of the dam jig 13, hardening of the thermosetting adhesive that bonds the object to be attached P2 and the display panel P1 is facilitated, so that a time required for the air removing processing can be shortened. After the adhesive on the side close to the dam jig 13 is hardened, hardening can progress from the dam jig 13 toward a center part of the display panel P1. Thus, bubbles of a volatile gas and the air generated after attachment can be effectively brought to flow toward the non-sealed portion 34 and emitted.

In the display panel P1 formed into a square shape, when three sides around the display panel are sealed by the dam jig 13 and the non-sealed portion 34 is exposed in the remaining side part, a structure of the dam jig 13 can be simplified and manufacturing cost thereof can be reduced. This is because there is a need for preparing an exclusive dam jig 13 in accordance with a difference in an outer shape and size of the display panel P1 and the dam jig 13 cannot be shared.

With the attachment method of the display panel according to the present invention, the attachment body is obtained through the step of loading the display panel P1 and the object to be attached P2 to predetermined positions, the step of applying the adhesive by the dispenser 5, the step of positioning by the alignment devices 18, the step of attaching the object to be attached P2 to the display panel P1 under the vacuum environment, and the step of bringing the vacuum chamber unit 3 into a standing posture and removing bubbles generated on the attachment surface. In the step of removing bubbles, the non-sealed portion 34 is placed at the standing upper end of the display panel P1, and bubbles generated on the attachment surface are discharged from the non-sealed portion 34. With such an attachment method, bubbles of a volatile gas and the air generated after attachment can be brought to flow upward along a not-yet-hardened adhesive layer, and emitted from the non-sealed portion 34. Thus, there is not space for bubbles to remain on the attachment surface, and the defectiveness ratio of the attachment body can be remarkably lowered to improve the productivity of the attachment tasks.

In the above attachment method, when the plurality of vacuum chamber units 3 is arranged in the rotation table 1, the preparation stage is provided around the rotation table 1, and the preparation task and the air removing task of bubbles are performed in parallel, a series of attachment tasks can be performed for a shorter time to further improve the productivity of the attachment tasks. Specifically, with respect to the vacuum chamber unit 3 set on the preparation stage, ejection of the attachment body, loading of a new display panel P1 and an object to be attached P2, and application of the adhesive by the dispenser 5 can be performed. At the same time, in the vacuum chamber unit 3 not placed on the preparation stage, the same unit 3 can be brought into an inclined posture, and bubbles generated on the attachment surface can be removed. Therefore, a series of attachment tasks can be performed for a shorter time to further improve the productivity of the attachment tasks.

BRIEF DESCRIPTION OF THE DRAWINGS

FIG. 6 is a sectional view taken along the line B-B in FIG. 5.

FIG. 7 is a C arrow view in FIG. 2.

FIG. 8 is a partially broken side view showing an outline of an alignment device.

FIGS. 9A to 9C are explanatory views of actions of an attachment unit.

MODE FOR CARRYING OUT THE INVENTION

First Embodiment

Figure 1:
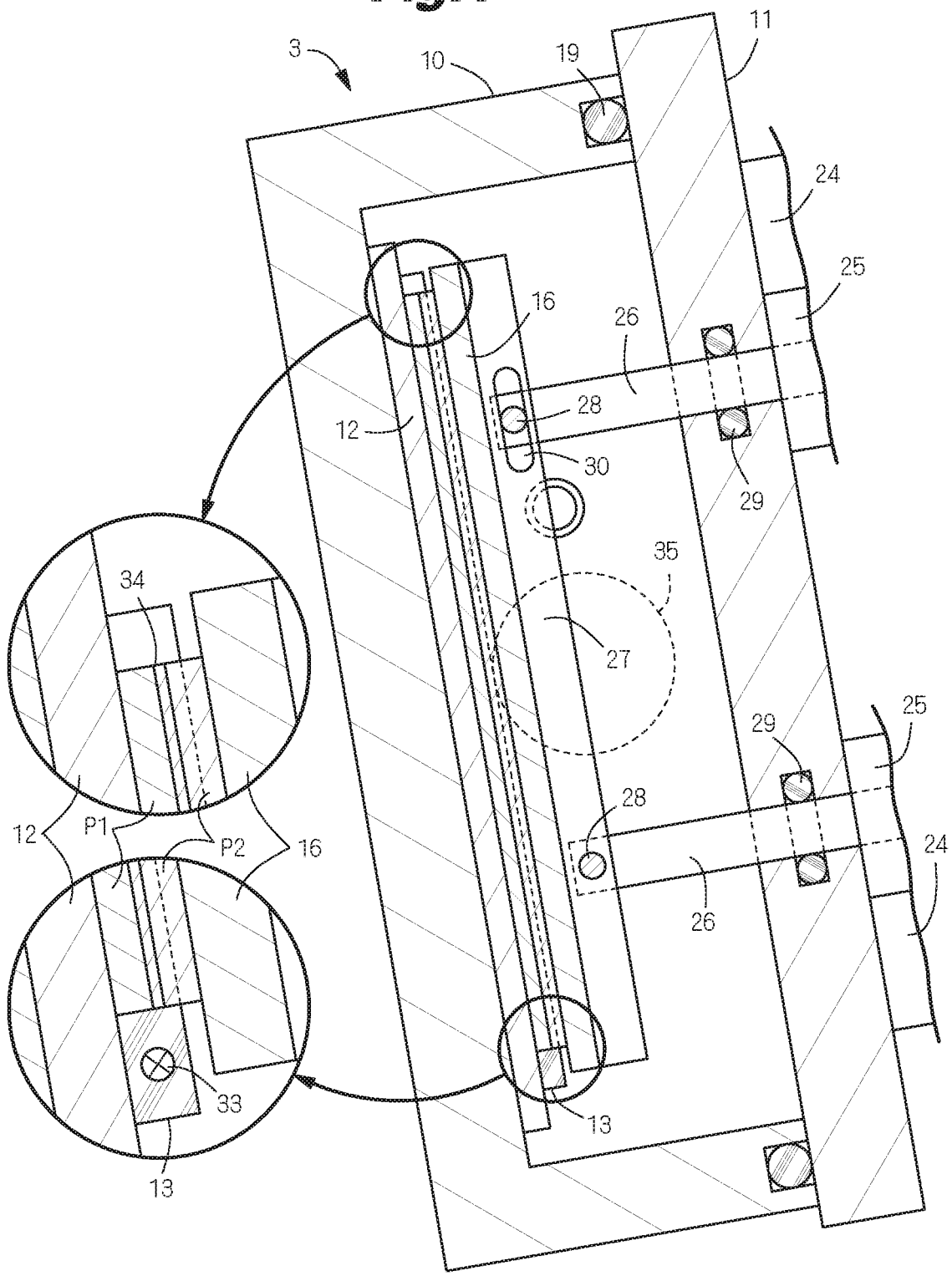
FIG. 1 is a vertically sectional view in which a vacuum chamber unit according to the present invention is brought into an air removing posture.
Figure 2:
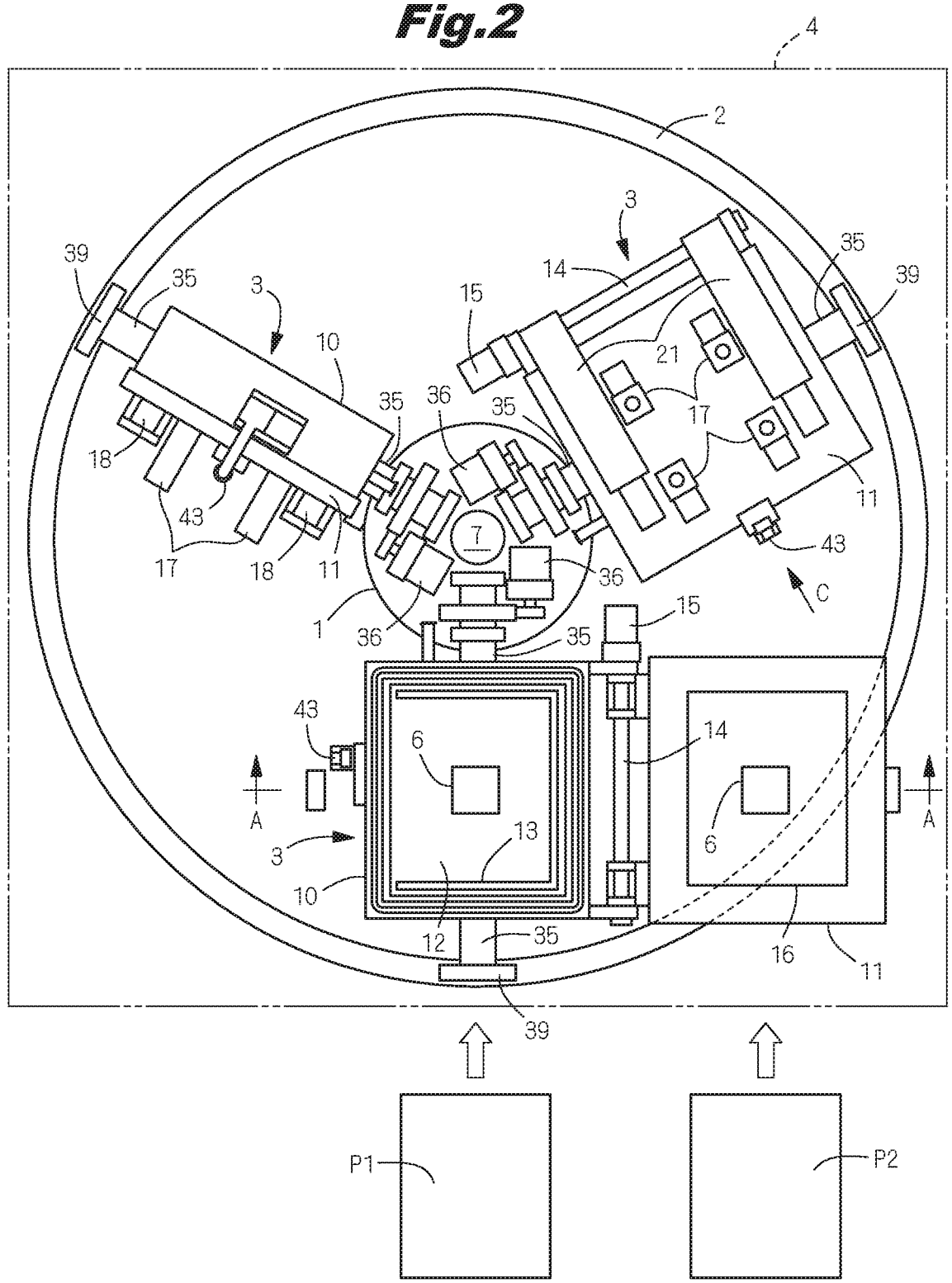
FIG. 2 is an overall plan view of an attachment device according to the present invention.

FIGS. 1 to 10 show an embodiment of an attachment device of a display panel according to the present invention (hereinafter, simply referred to as the attachment device). In FIG. 2, in the attachment device, a central rotation table 1 and a ring shape guide rail 2 arranged concentrically to the same table 1 serve as a base, three vacuum chamber units 3 are arranged at equal intervals (by 120 degrees) in the circumferential direction of the rotation table 1, and these members are accommodated in a cubic booth 4. Although not shown in the figures, a vacuum source that exhausts the air in the vacuum chamber units 3 is arranged in a lower-half lower part of the booth 4, and a dispenser 5 that applies an adhesive to a display panel P1 and CCD cameras 6 for alignment devices 18 are arranged in a front surface upper part of the booth 4 (refer to FIG. 3). The rotation table 1 can be turned together with a center shaft 7 thereof, and forward driven or reversely driven by a table drive device (table drive structure) (not shown).

Figure 3:
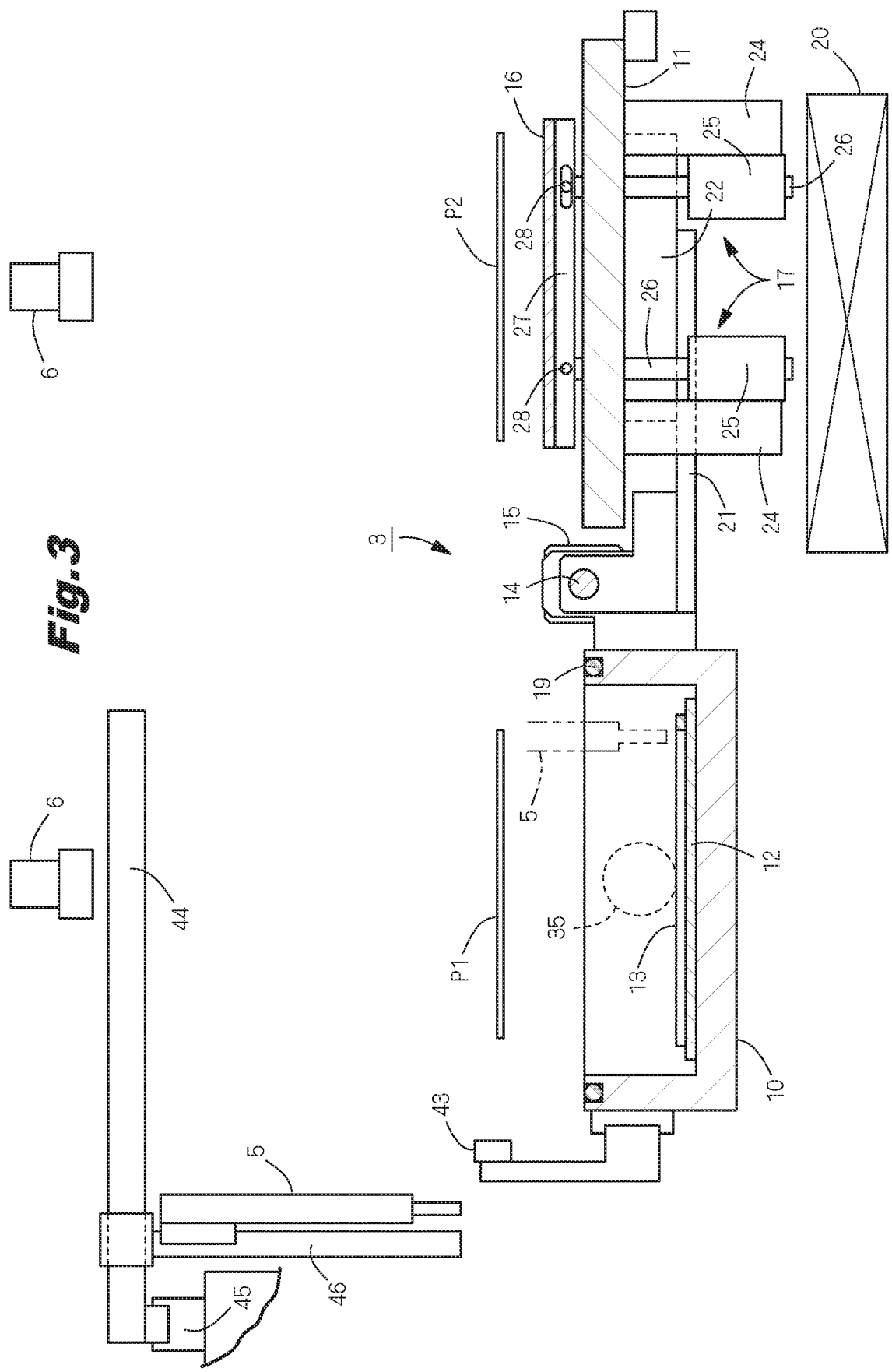
FIG. 3 is a sectional view taken along the line A-A in FIG. 2.

In FIG. 3, the vacuum chamber unit 3 is formed by a hollow box shape chamber main body 10 opened upward, and a chamber lid body 11 openably closing an upper opening of the chamber main body 10. A fixed attachment base 12 is arranged in an interior of the chamber main body 10, and a dam jig 13 is fixed to an upper surface thereof. The chamber lid body 11 is coupled to the chamber lid body 11 via an oscillation shaft 14 so as to be oscillated and opened/closed, and a motor 15 that drives and rotates the same shaft 14 is loaded to a shaft end of the oscillation shaft 14. On a lid surface of the chamber lid body 11 (on the side of facing the fixed attachment base 12 in a state where the chamber lid body 11 is closed), a movable attachment base 16 is arranged in correspondence with the fixed attachment base 12. On an outer lid surface of the chamber lid body 11 (on the upper surface side in a state where the chamber lid body 11 is closed), attachment units 17 that press the movable attachment base 16 toward the fixed attachment base 12, and an alignment device that positions the display panel P1 and an object to be attached P2 are provided. The display panel P1 is formed by a square liquid crystal panel, and fitted and loaded to the dam jig 13. The object to be attached P2 is formed by a touch panel having the same shape and the same size as the liquid crystal panel. A seal ring (seal body) 19 is arranged in an upper end of an opening peripheral wall of the chamber main body 10.

A pair of lid support frames 21 is fixed to the oscillation shaft 14. The positioning structures 18 are provided in these lid support frames 21, and the chamber lid body 11 is fixed to alignment bases 22 thereof (refer to FIG. 5). The alignment device is formed by the above positioning structures 18, and an alignment structure 20 provided in a preparation stage. The positioning structures 18 include the alignment bases 22 capable of sliding forward/backward and leftward/rightward. The alignment structure 20 takes in image information (position information) outputted from the CCD cameras 6 described above, brings a position of the display panel P1 to a reference position, confirms a state of displacement of the object to be attached P2, determines the direction of adjustment and movement and a moving amount, and then couples drive shafts 23 thereof to driven shafts of the alignment bases 22 as shown by imaginary lines in FIG. 8, drives and adjusts the alignment bases 22, and adjusts a position of the chamber lid body 11. It should be noted that although not shown in the figures, brakes that inhibit movement of the alignment bases 22 are provided in the positioning structures 18 in order to regulate the movement of the alignment bases 22 after adjustment of the position. Although confirmation of the state of displacement and adjustment and moving of the alignment bases 22 are performed several times, this adjustment of the position is completed for a few seconds. When the alignment structure 20 is provided in the preparation stage as described above, there is no need for providing the alignment structure 20 in each of the vacuum chamber units 3. Therefore, a structure of the chamber lid body 11 can be simplified to be lightweight. Thus, a drive load when the vacuum chamber unit 3 stands up can be reduced.

Figure 5:
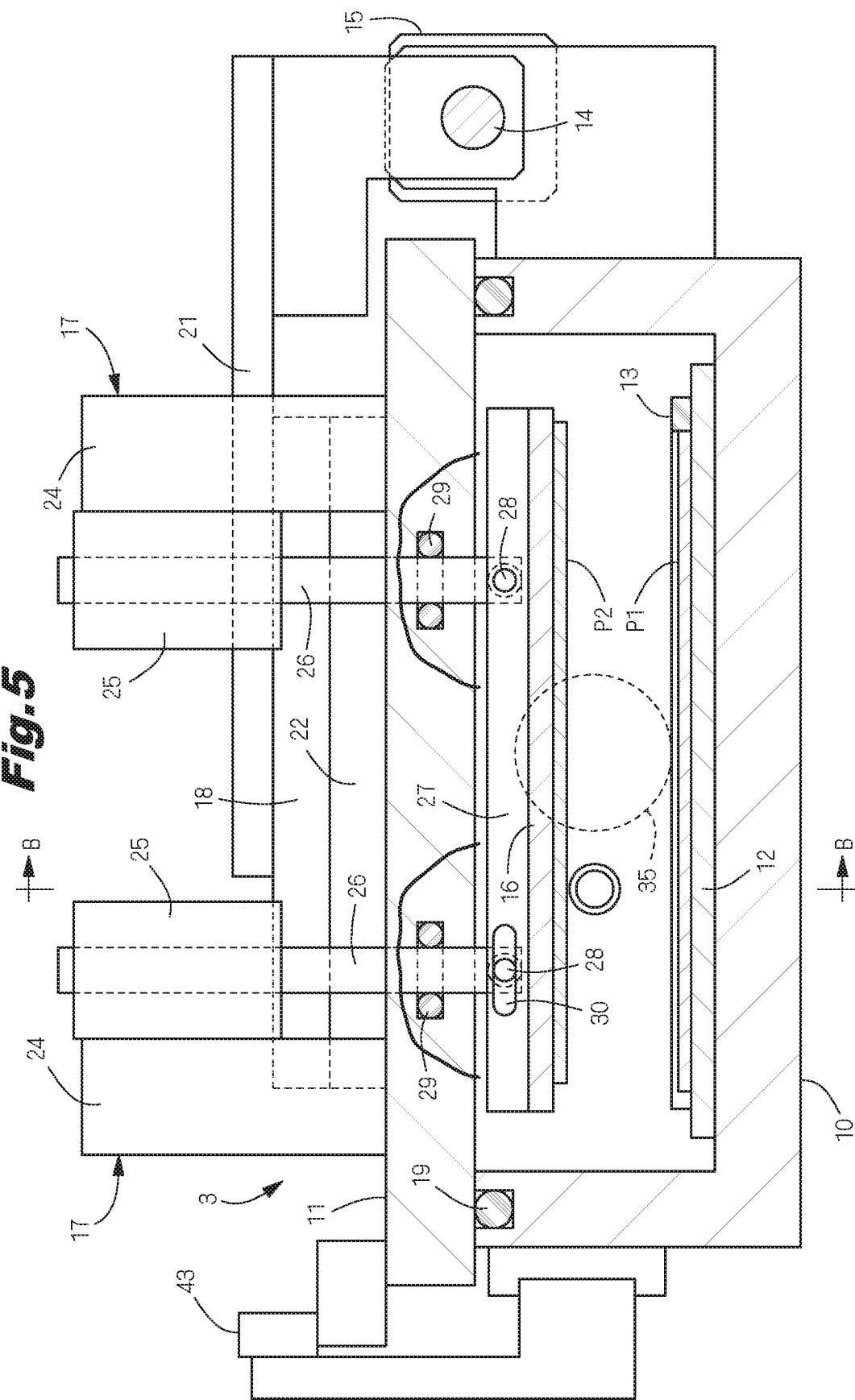
FIG. 5 is a vertically-cut front view of a state where a chamber lid body is closed.
Figure 10A:
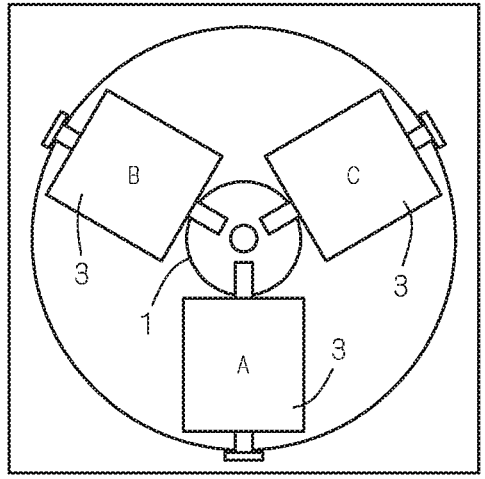
FIGS. 10A to 10D are explanatory views showing a turning action of the attachment device.
Figure 10C:
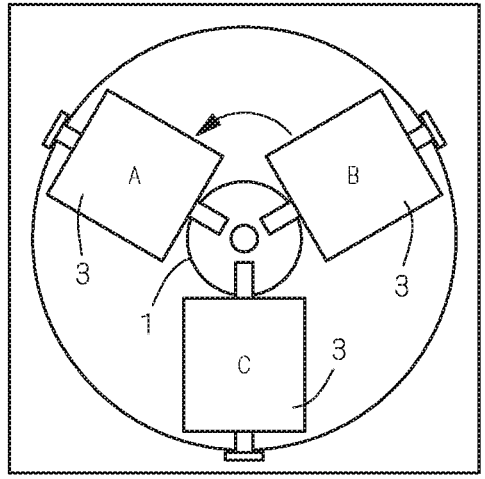
Figure 10B:
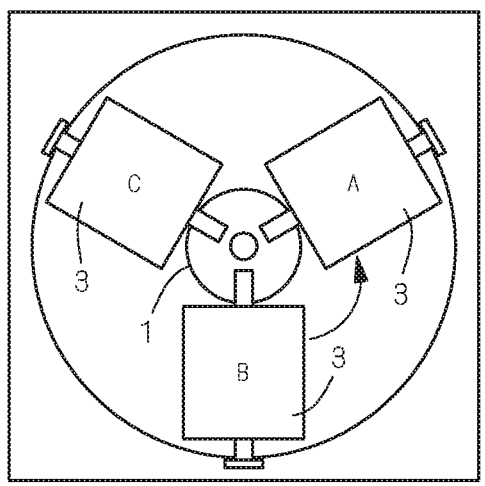
Figure 10D:
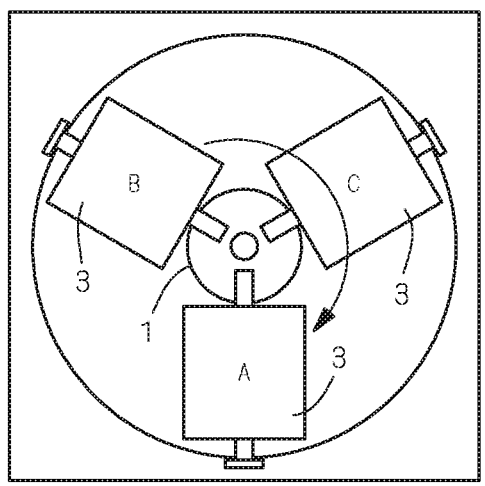

The attachment units 17 are formed by guide frames 24 fixed to the alignment bases 22, a plurality of sliders 25 upward/downward movably guided and supported by the guide frames 24, a drive mechanism that drives and slides the sliders 25 upward/downward (not shown), a plurality of attachment shafts 26 that reciprocate and slide together with upward/downward movement of the sliders 25, and the like. The attachment shafts 26 are arranged at four points, pass through an interior and an exterior of the chamber lid body 11, and lower ends thereof are coupled to support frames 27 fixed to the movable attachment base 16 by pins 28. Parts between through holes of the chamber lid body 11 and the attachment shafts 26 are sealed by seal bodies 29 in such a manner that no air ventilation is allowed. The attachment shaft 26 on the right side in FIG. 5 is simply coupled to the support frame 27 by the pin 28. However, the attachment shaft 26 on the left side in FIG. 5 is coupled to the support frame 27 via the pin 28 and a long hole 30. This is to attach the object to be attached P2 loaded to the movable attachment base 16 to the display panel P1 in an inclined state.

Figure 4:
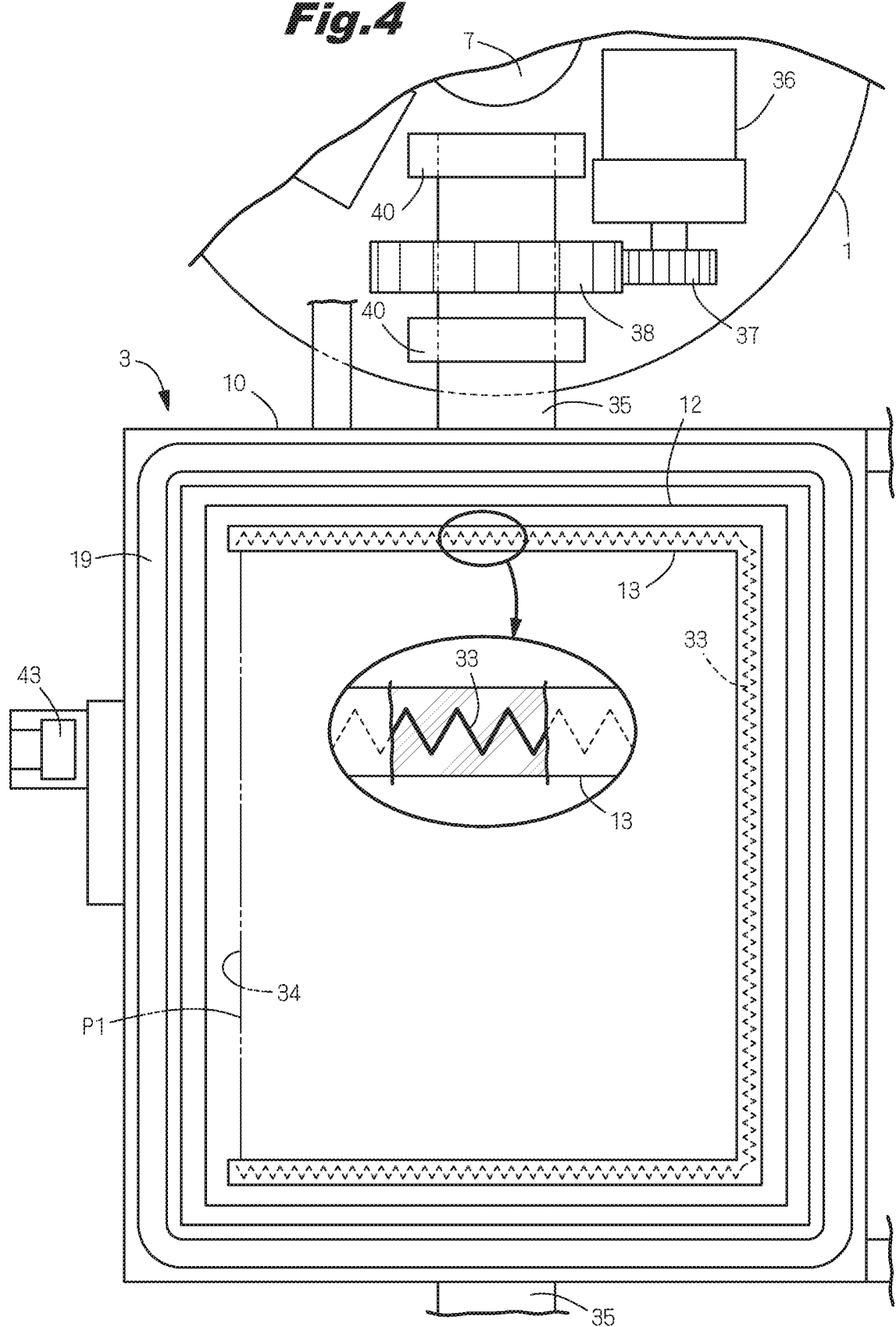
FIG. 4 is a plan view of a chamber main body and a dam jig.

As shown in FIG. 3, the dispenser 5 is supported by three rod-less cylinders 44 to 46 that reciprocate and drive in the X-axis, Y-axis, and Z-axis directions. The dispenser can apply the adhesive to the display panel P1 loaded to the dam jig 13 in an arbitrary pattern. The adhesive is made of a two-component thermosetting silicone adhesive. As shown in FIG. 4, the dam jig 13 is formed by a U shape rubber frame body surrounding three sides around the display panel P1, and a heater (heating body) 33 that facilitates hardening of the adhesive is arranged in an interior thereof. The dam jig 13 is provided in order to prevent flowing and diffusion of the adhesive applied to the display panel P1. A non-sealed portion 34 is exposed in a peripheral part of the panel (peripheral part of the display panel P1) not in contact with the dam jig 13. The thickness of the dam jig 13 is set to be slightly larger than the total thickness of the display panel P1 and an adhesive layer but set to be smaller than the total thickness in a case where the object to be attached P2 is attached to the display panel P1 via the adhesive layer (refer to FIG. 1).

In order to let the vacuum chamber unit 3 stand up in an entirely inclined state from a horizontal attachment posture, a chamber inclination device is provided. In FIGS. 4 and 7, the chamber inclination device is formed by a pair of inclination shafts 35 fixed to facing wall surfaces of the chamber main body 10 along the axis parallel to the oscillation shaft 14, an inclination motor 36 that drives and rotates the inclination shafts 35, a driving gear 37 and a driven gear 38 that reduce and transmit rotation power of the inclination motor 36 to the inclination shafts 35, a roller 39 loaded to the inclination shaft 35 crossing the guide rail 2, and the like. The reference signs 40 denote a pair of brackets rotatably and axially supporting the inclination shaft 35, and both the brackets 40 and the roller 39 support the vacuum chamber unit 3. In a state where the vacuum chamber unit 3 stands up by the chamber inclination device, as shown in FIG. 1, the above non-sealed portion 34 is placed at an inclination upper end of the display panel P1. A standing angle of the vacuum chamber unit 3 is preferably selected within a range from 30 degrees to 80 degrees. This is because there is a fear that with a too large standing angle, unreasonable force is added to the display panel P1 or the object to be attached P2 and the original function is lost. However, regarding a display panel P1 and an object to be attached P2 without having such a fear, bubbles may be emitted with the standing angle of 90 degrees.

The vacuum chamber unit 3 formed as above goes through the preparation stage placed in front of the booth 4, an attachment stage, and an air removing stage, and performs a series of attachment processing. The attachment stage is placed at a position where the rotation table 1 is forward rotated in the anti-clockwise direction by 120 degrees from the preparation stage. The air removing stage is placed at a position where the rotation table 1 is further forward rotated in the anti-clockwise direction by 120 degrees from the attachment stage.

As shown in FIG. 2, on the preparation stage, the chamber lid body 11 is opened and an attachment body after completion of the attachment processing is ejected from the dam jig 13. Further, a new display panel P1 is loaded to the dam jig 13, and an object to be attached P2 is loaded to the movable attachment base 16. Next, the rod-less cylinders 44 to 46 and the dispenser 5 are activated and the adhesive is applied to an upper surface of the display panel P1 in a predetermined pattern. In this state, the alignment devices 18 are activated, the object to be attached P2 and the display panel P1 are positioned based on the image information of the CCD cameras 6, and the chamber lid body 11 is operated and closed. Ejection of the attachment body after completion of the attachment processing and loading of the display panel P1 and the object to be attached P2 may be performed by an industrial robot or may be performed manually.

On the attachment stage, after the chamber lid body 11 is closed and bonded to the chamber main body 10, as shown in FIG. 7, the chamber lid body 11 is locked and fixed by a lock tool 43 provided in the chamber main body 10 in such a manner that the chamber lid body cannot be opened. Next, after an interior of the vacuum chamber unit 3 is brought into a vacuum state, the attachment units 17 are activated, the movable attachment base 16 is pressed onto the fixed attachment base 12, and the object to be attached P2 is attached to the display panel P1. On the air removing stage, the chamber inclination device is activated while a vacuum state is maintained, the vacuum chamber unit 3 finishing the attachment processing is brought into an inclined posture, and bubbles generated on an attachment surface are removed from the non-sealed portion 34. A time required for air removing is about 20 seconds. When a vacuum state is cancelled and the interior of the vacuum chamber unit 3 becomes the same as ambient pressure, there is a fear that the chamber lid body 11 is separated from the chamber main body 10. In order to prevent such separation of the chamber lid body 11, the chamber lid body 11 is locked and fixed by the lock tool 43.

A series of attachment processing is performed by forward rotating the rotation table 1 by 120 degrees in twice so that two different vacuum chamber units 3 are set on the preparation stage, and then reversely rotating the rotation table 1 by 240 degrees so that the remaining vacuum chamber unit 3 is set on the preparation stage. As shown in FIGS. 10A to 10D, every time the rotation table 1 is forward rotated by 120 degrees, stage positions of the three vacuum chamber units 3 are different. By reversely rotating the rotation table 1 by 240 degrees, the three vacuum chamber units 3 can be returned to an initial state.

Attachment on the attachment stage is performed as shown in FIG. 9. Firstly, as shown in FIG. 9A, the pair of attachment shafts 26 on the side close to the oscillation shaft 14 is lowered under a vacuum environment, and the movable attachment base 16 and the object to be attached P2 are inclined. At this time, an inclination upper end of the object to be attached P2 is in an up-down relationship with the non-sealed portion 34 of the display panel P1. Next, as shown in FIG. 9B, the four attachment shafts 26 are lowered at the same time, and an inclination lower edge of the object to be attached P2 is pressed onto the display panel P1. That is, in a state where the movable attachment base 16 is inclined in non-parallel to the fixed attachment base 12, attachment of the object to be attached P2 and the display panel P1 is started.

Further, as shown in FIG. 9B, the two attachment shafts 26 supporting an inclination upper edge of the object to be attached P2 are gradually lowered, and while gradually decreasing inclination of the movable attachment base 16 from an attachment start end to an attachment terminal end, the object to be attached P2 is attached to the display panel P1. Trajectory differences of the pins 28 at this time are absorbed by the long holes 30. Finally, the movable attachment base 16 is pressed onto the fixed attachment base 12 by the four attachment shafts 26, and the entire surfaces of the object to be attached P2 and the display panel P1 are closely attached via the adhesive layer. As described above, when the object to be attached P2 is attached to the display panel P1 while gradually decreasing inclination of the movable attachment base 16 from the attachment start end to the attachment terminal end, attachment can be performed while pressing the minute air contained in the adhesive toward the attachment terminal end. Thus, enclosure of bubbles in the attachment surface at the time of attachment can be solved.

On the air removing stage, as shown in FIG. 1, the vacuum chamber unit 3 is operated to stand into an inclined posture by the chamber inclination device, and the non-sealed portion 34 is placed at the inclination upper end (standing upper end) of the display panel P1. The interior of the vacuum chamber unit 3 is maintained in a vacuum state, the adhesive is heated by the heater 33 embedded in the dam jig 13, and hardening is started from the side close to the dam jig 13. Therefore, even when a volatile gas of a solvent contained in the adhesive and the air contained in the adhesive layer join to form masses of bubbles together with hardening of the adhesive, masses of bubbles are brought to flow upward in the not-yet-hardened adhesive layer and emitted from the non-sealed portion 34. In such a way, air removing processing is performed in a state where the non-sealed portion 34 is placed at the inclination upper end of the display panel P1 under the vacuum environment, bubbles of a volatile gas and the air generated after attachment can be promptly and reliably discharged from the non-sealed portion 34. Thus, a defectiveness ratio of the attachment body can be remarkably lowered to improve productivity of attachment tasks.

In an attachment method of a display panel according to the present invention, attachment can be performed in the following mode by using the above attachment device.

In the attachment method of the display panel according to the present invention, the display panel P1 accommodated in the vacuum chamber unit 3 and the object to be attached P2 are attached under the vacuum environment. Specifically, the attachment method includes a step of opening the chamber lid body 11 of the vacuum chamber unit 3, loading the display panel P1 to the dam jig 13 provided in the fixed attachment base 12 which is provided in the interior of the chamber main body 10, and loading the object to be attached P2 to the movable attachment base 16 provided in the interior of the chamber lid body 11, a step of applying the adhesive to the display panel P1 by the dispenser 5, a step of driving and adjusting the alignment bases 22 supporting the chamber lid body 11 by the alignment structure 20 to position the display panel P1 and the object to be attached P2, a step of closing the chamber lid body 11, under the vacuum environment where the air in the vacuum chamber unit 3 is exhausted, pressing the movable attachment base 16 onto the fixed attachment base 12, and attaching the object to be attached P2 to the display panel P1, and a step of bringing the entire vacuum chamber unit 3 into an inclined posture by the chamber inclination device, and removing bubbles generated on the attachment surface while a vacuum state is maintained. In the step of loading the display panel P1 to the dam jig 13, a large part of a peripheral surface of the display panel P1 is sealed by the dam jig 13 to prevent flowing and diffusion of the adhesive applied to the display panel P1, and the non-sealed portion 34 is exposed in the peripheral part of the display panel P1 not in contact with the dam jig 13. In the step of removing bubbles, the non-sealed portion 34 is placed at the inclination upper end of the display panel P1, and bubbles generated on the attachment surface are discharged from the non-sealed portion 34.

In the above attachment method, the plurality of vacuum chamber units 3 is arranged in the rotation table 1, and the preparation stage on which the display panel P1 and the object to be attached P2 are supplied to the vacuum chamber unit 3, the attachment body after attachment is ejected from the vacuum chamber unit 3, and the adhesive is applied to the display panel P1 is provided around the rotation table 1. The vacuum chamber units 3 are placed on the preparation stage one by one by forward rotating the rotation table 1 by a predetermined angle and further reversely rotating the rotation table 1 by the rotation angle at the time of forward rotation. The vacuum chamber unit 3 not placed on the preparation stage is brought into an inclined posture by the chamber inclination device, and bubbles generated on the attachment surface are removed.

Although the preparation stage, the attachment stage, and the air removing stage are provided around the rotation table 1 in the above embodiment, there is no such a need. For example, two vacuum chamber units 3 may be arranged at opposing positions around the rotation table 1, so that a series of attachment processing can be performed by forward moving the same units by 180 degrees and then reversely moving by 180 degrees. In that case, a preparation stage may be provided at one of the opposing positions around the rotation table 1, and a stage for performing attachment and air removing may be provided at the other position. Similarly, vacuum chamber units 3 may be arranged at four or more points around the rotation table 1, so that a series of attachment processing can be performed simultaneously.

The heating body 33 may be a heat source other than the heater and may be arranged in the fixed attachment base 12. Heating bodies 33 may be arranged in parallel from the most distant position from the non-sealed portion 34 of the fixed attachment base 12 toward the non-sealed portion 34, so that air removing can be performed by activating the heating body 33 arranged at the most distant position from the non-sealed portion 34 at first and activating other heating bodies 33 in order toward the non-sealed portion 34. The dam jig 13 can be formed in a polygonal shape, a circular shape, or the like in accordance with an outer shape of the display panel P1, and an open part for forming the non-sealed portion 34 may be provided in a part of the dam jig. The forward rotation direction when the rotation table 1 is rotated may also be the clockwise direction. By increasing a diameter of the rotation table 1, the plurality of vacuum chamber units 3 can be arranged on an upper surface of the rotation table. In that case, an inclination window for permitting inclination of the vacuum chamber unit 3 may be opened on a table surface facing the vacuum chamber unit 3. Although the vacuum chamber unit 3 is double-supported by the rotation table 1 and the guide rail 2 in the above embodiment, the guide rail 2 and the roller 39 may be omitted and the vacuum chamber unit may be cantilevered.

DESCRIPTION OF REFERENCE SIGNS

1 Rotation table
2 Guide rail
3 Vacuum chamber unit
5 Dispenser
10 Chamber main body
11 Chamber lid body
12 Fixed attachment base
13 Dam jig 16 Movable attachment base
17 Attachment unit
18 Positioning structure
20 Alignment structure
26 Attachment shaft
33 Heating body (heater)
34 Non-sealed portion
P1 Display panel
P2 Object to be attached

The invention claimed is:

1. An attachment device for a display panel comprising:
a vacuum chamber unit (3);
a vacuum source that exhausts the air in the vacuum chamber unit (3), and
a chamber inclination device that is configured to swing the vacuum chamber unit between a horizontal posture and an inclined posture wherein the horizontal posture means that the vacuum chamber unit stays in a horizontal direction, which is perpendicular to the gravity, and the inclined posture means that the vacuum chamber unit inclines with respect to the horizontal direction, wherein
the vacuum chamber unit (3) is formed by a chamber main body (10) and a chamber lid body (11) wherein a fixed attachment base (12) including a dam jig (13) is provided in the chamber main body (10), and a movable attachment base (16) is provided in the chamber lid body (11),
the dam jig (13), which has a predetermined thickness to block an adhesive, is installed along a large part of a peripheral surface of the display panel (P1) to prevent flowing and diffusion of the adhesive applied to the display panel (P1), and a non-sealed portion (34) is exposed in a peripheral part of the display panel (P1) wherein the peripheral part is defined as a portion where the dam jig (13) is not installed along the peripheral surface of the display panel,
the vacuum source exhausts the air in the vacuum chamber unit (3) while the chamber lid body (11) is closed such that a vacuum environment is created where the vacuum chamber unit (3) is placed in a vacuum,
under the vacuum environment, the movable attachment base (16) is pressed toward the fixed attachment base (12) and an object to be attached (P2) is attached to the display panel (P1), and
while under the vacuum environment where the display panel (P1) and the object to be attached (P2) are attached, the chamber inclination device raises the vacuum chamber unit (3) from the horizontal posture to the inclined posture wherein the vacuum chamber unit inclines at a range from 30 degrees to 90 degrees with respect to the horizontal direction such that the non-sealed portion (34) is placed above the dam jig, and bubbles generated on an attachment surface in a process of hardening the adhesive are removed from the non-sealed portion (34).

2. The attachment device for the display panel according to claim 1, wherein
attachment units (17) that press the movable attachment base (16) toward the fixed attachment base (12), and positioning structures (18) movably supporting the movable attachment base (16) to position the object to be attached (P2) with respect to the display panel (P1) loaded to the dam jig (13) are provided in the chamber lid body (11), and
in a state where the chamber lid body (11) is opened, alignment bases (22) of the positioning structures (18) are driven and adjusted by an alignment structure (20) to position the display panel (P1) and the object to be attached (P2).

3. The attachment device for the display panel according to claim 1, wherein
a plurality of vacuum chamber units (3) is arranged at equal intervals in the circumferential direction of a rotation table (1),
a preparation stage on which after an attachment body is ejected from the vacuum chamber unit (3), the display panel (P1) and the object to be attached (P2) are loaded to the vacuum chamber unit (3) and the adhesive is applied to the display panel (P1) by a dispenser (5) is provided in the vicinity of the rotation table (1),
a different one of the vacuum chamber units (3) is set on the preparation stage by forward moving or reversely moving the rotation table (1) by a table drive structure, and
the vacuum chamber unit (3) not placed on the preparation stage is brought into an inclined posture by the chamber inclination device, and bubbles generated on the attachment surface are removed.

4. The attachment device for the display panel according to claim 2, wherein
a plurality of vacuum chamber units (3) is arranged at equal intervals in the circumferential direction of a rotation table (1),
a preparation stage on which after an attachment body is ejected from the vacuum chamber unit (3), the display panel (P1) and the object to be attached (P2) are loaded to the vacuum chamber unit (3) and the adhesive is applied to the display panel (P1) by a dispenser (5) is provided in the vicinity of the rotation table (1),
a different one of the vacuum chamber units (3) is set on the preparation stage by forward moving or reversely moving the rotation table (1) by a table drive structure, and
the vacuum chamber unit (3) not placed on the preparation stage is brought into an inclined posture by the chamber inclination device, and bubbles generated on the attachment surface are removed.

5. The attachment device for the display panel according to claim 3, wherein
three vacuum chamber units (3) are arranged at equal intervals in the circumferential direction on the rotation table (1),
after two different vacuum chamber units (3) are individually set on the preparation stage by forward rotating the rotation table (1) by 120 degrees, the remaining vacuum chamber unit (3) is set on the preparation stage by reversely rotating the rotation table (1) by 240 degrees, and
the object to be attached (P2) is attached to the display panel (P1) by one of the two vacuum chamber units (3) not set on the preparation stage, the remaining vacuum chamber (3) is brought into an inclined posture by the chamber inclination device, and bubbles generated on the attachment surface are removed.

6. The attachment device for the display panel according to claim 4, wherein
three vacuum chamber units (3) are arranged at equal intervals in the circumferential direction on the rotation table (1),
after two different vacuum chamber units (3) are individually set on the preparation stage by forward rotating the rotation table (1) by 120 degrees, the remaining vacuum chamber unit (3) is set on the preparation stage by reversely rotating the rotation table (1) by 240 degrees, and the object to be attached (P2) is attached to the display panel (P1) by one of the two vacuum chamber units (3) not set on the preparation stage, the remaining vacuum chamber (3) is brought into an inclined posture by the chamber inclination device, and bubbles generated on the attachment surface are removed.

7. The attachment device for the display panel according to claim 3, wherein the positioning structures (18) are provided in lid support frames (21) to be oscillated and opened/closed with respect to the chamber main body (10), and the chamber lid body (11) is loaded to the alignment bases (22) of the positioning structures (18), the alignment structure (20) that drives and adjusts the alignment bases (22) is arranged in the preparation stage, the attachment units (17) include guide frames (24) fixed to the alignment bases (22), a plurality of sliders (25) upward/downward movably guided and supported by the guide frames (24), a drive mechanism that drives and slides the sliders (25) upward/downward, and a plurality of attachment shafts (26) that reciprocate and slide together with upward/downward movement of the sliders (25), the attachment shafts (26) pass through an interior and an exterior of the chamber lid body (11), and shaft ends of the attachment shafts are coupled to an upper part of the movable attachment base (16) in the interior of the chamber lid body (11), parts between through holes of the chamber lid body (11) and the attachment shafts (26) are sealed by seal bodies (29) in such a manner that no air ventilation is allowed, in a state where the chamber lid body (11) is closed and an interior of the vacuum chamber unit (3) is vacuum, the sliders (25) are driven and slid by the drive mechanism, and in a state where the movable attachment base (16) is inclined in non-parallel to the fixed attachment base (12), attachment of the object to be attached (P2) and the display panel (P1) is started, and while gradually decreasing an inclination angle of the movable attachment base (16) from an attachment start end to an attachment terminal end, the object to be attached (P2) and the display panel (P1) are attached.

8. The attachment device for the display panel according to claim 4, wherein the positioning structures (18) are provided in lid support frames (21) to be oscillated and opened/closed with respect to the chamber main body (10), and the chamber lid body (11) is loaded to the alignment bases (22) of the positioning structures (18), the alignment structure (20) that drives and adjusts the alignment bases (22) is arranged in the preparation stage, the attachment units (17) include guide frames (24) fixed to the alignment bases (22), a plurality of sliders (25) upward/downward movably guided and supported by the guide frames (24), a drive mechanism that drives and slides the sliders (25) upward/downward, and a plurality of attachment shafts (26) that reciprocate and slide together with upward/downward movement of the sliders (25), the attachment shafts (26) pass through an interior and an exterior of the chamber lid body (11), and shaft ends of the attachment shafts are coupled to an upper part of the movable attachment base (16) in the interior of the chamber lid body (11), parts between through holes of the chamber lid body (11) and the attachment shafts (26) are sealed by seal bodies (29) in such a manner that no air ventilation is allowed, in a state where the chamber lid body (11) is closed and an interior of the vacuum chamber unit (3) is vacuum, the sliders (25) are driven and slid by the drive mechanism, and in a state where the movable attachment base (16) is inclined in non-parallel to the fixed attachment base (12), attachment of the object to be attached (P2) and the display panel (P1) is started, and while gradually decreasing an inclination angle of the movable attachment base (16) from an attachment start end to an attachment terminal end, the object to be attached (P2) and the display panel (P1) are attached.

9. The attachment device for the display panel according to claim 5, wherein the positioning structures (18) are provided in lid support frames (21) to be oscillated and opened/closed with respect to the chamber main body (10), and the chamber lid body (11) is loaded to the alignment bases (22) of the positioning structures (18), the alignment structure (20) that drives and adjusts the alignment bases (22) is arranged in the preparation stage, the attachment units (17) include guide frames (24) fixed to the alignment bases (22), a plurality of sliders (25) upward/downward movably guided and supported by the guide frames (24), a drive mechanism that drives and slides the sliders (25) upward/downward, and a plurality of attachment shafts (26) that reciprocate and slide together with upward/downward movement of the sliders (25), the attachment shafts (26) pass through an interior and an exterior of the chamber lid body (11), and shaft ends of the attachment shafts are coupled to an upper part of the movable attachment base (16) in the interior of the chamber lid body (11), parts between through holes of the chamber lid body (11) and the attachment shafts (26) are sealed by seal bodies (29) in such a manner that no air ventilation is allowed, in a state where the chamber lid body (11) is closed and an interior of the vacuum chamber unit (3) is vacuum, the sliders (25) are driven and slid by the drive mechanism, and in a state where the movable attachment base (16) is inclined in non-parallel to the fixed attachment base (12), attachment of the object to be attached (P2) and the display panel (P1) is started, and while gradually decreasing an inclination angle of the movable attachment base (16) from an attachment start end to an attachment terminal end, the object to be attached (P2) and the display panel (P1) are attached.

10. The attachment device for the display panel according to claim 6, wherein the positioning structures (18) are provided in lid support frames (21) to be oscillated and opened/closed with respect to the chamber main body (10), and the chamber lid body (11) is loaded to the alignment bases (22) of the positioning structures (18), the alignment structure (20) that drives and adjusts the alignment bases (22) is arranged in the preparation stage, the attachment units (17) include guide frames (24) fixed to the alignment bases (22), a plurality of sliders (25) upward/downward movably guided and supported by the guide frames (24), a drive mechanism that drives and slides the sliders (25) upward/downward, and a plurality of attachment shafts (26) that reciprocate and slide together with upward/downward movement of the sliders (25), the attachment shafts (26) pass through an interior and an exterior of the chamber lid body (11), and shaft ends of the attachment shafts are coupled to an upper part of the movable attachment base (16) in the interior of the chamber lid body (11), parts between through holes of the chamber lid body (11) and the attachment shafts (26) are sealed by seal bodies (29) in such a manner that no air ventilation is allowed, in a state where the chamber lid body (11) is closed and an interior of the vacuum chamber unit (3) is vacuum, the sliders (25) are driven and slid by the drive mechanism, and in a state where the movable attachment base (16) is inclined in non-parallel to the fixed attachment base (12), attachment of the object to be attached (P2) and the display panel (P1) is started, and while gradually decreasing an inclination angle of the movable attachment base (16) from an attachment start end to an attachment terminal end, the object to be attached (P2) and the display panel (P1) are attached.

11. An attachment device for a display panel comprising:
a vacuum chamber unit (3); and
a vacuum source that exhausts the air in the vacuum chamber unit (3), wherein
the vacuum chamber unit (3) is formed by a chamber main body (10) and a chamber lid body (11), a fixed attachment base (12) including a dam jig (13) is provided in the chamber main body (10), and a movable attachment base (16) is provided in the chamber lid body (11),
the dam jig (13) is installed for sealing a large part of a peripheral surface of a display panel (P1) to prevent flowing and diffusion of an adhesive applied to the display panel (P1), and a non-sealed portion (34) is exposed in a peripheral part of the display panel (P1) not in contact with the dam jig (13),
under a vacuum environment where the chamber lid body (11) is closed and the air in the vacuum chamber unit (3) is exhausted by the vacuum source, the movable attachment base (16) is pressed toward the fixed attachment base (12) and an object to be attached (P2) is attached to the display panel (P1),
while under the vacuum environment where the display panel (P1) and the object to be attached (P2) are attached, the vacuum chamber unit (3) is brought into a standing posture by a chamber inclination device, the non-sealed portion (34) is placed at a standing upper end of the display panel (P1), and bubbles generated on an attachment surface in a process of hardening the adhesive are removed from the non-sealed portion (34), and
a heating body (33) that facilitates hardening of the thermosetting adhesive is arranged in an interior of the dam jig (13).

12. The attachment device for the display panel according to claim 2, wherein
a heating body (33) that facilitates hardening of the thermosetting adhesive is arranged in an interior of the dam jig (13).

13. The attachment device for the display panel according to claim 1, wherein the display panel (P1) is formed into a square shape, three sides around the display panel are sealed by the dam jig (13), and the non-sealed portion (34) is exposed in the remaining side part.

14. The attachment device for the display panel according to claim 2, wherein
the display panel (P1) is formed into a square shape, three sides around the display panel are sealed by the dam jig (13), and the non-sealed portion (34) is exposed in the remaining side part.

15. The attachment device for the display panel according to claim 1, wherein
at the inclined posture, the vacuum chamber unit inclines at a range from 30 degrees to 80 degrees with respect to the horizontal direction.

16. An attachment method of a display panel in which a display panel (P1) accommodated in a vacuum chamber unit (3) and an object to be attached (P2) are attached under a vacuum environment, the attachment method comprising:
a step of opening a chamber lid body (11) of the vacuum chamber unit (3), loading the display panel (P1) to a dam jig (13) provided in a fixed attachment base (12) which is provided in an interior of a chamber main body (10), and loading the object to be attached (P2) to a movable attachment base (16) provided in an interior of the chamber lid body (11);
a step of applying an adhesive to the display panel (P1) by a dispenser (5);
a step of driving and adjusting alignment bases (22) supporting the chamber lid body (11) by an alignment structure (20) to position the display panel (P1) and the object to be attached (P2);
a step of closing the chamber lid body (11), under the vacuum environment where the air in the vacuum chamber unit (3) is exhausted, pressing the movable attachment base (16) onto the fixed attachment base (12), and attaching the object to be attached (P2) to the display panel (P1); and
a step of bringing the entire vacuum chamber unit (3) into an inclined posture by a chamber inclination device, and removing bubbles generated on an attachment surface while a vacuum state is maintained, wherein
in the step of loading the display panel (P1) to the dam jig (13), a large part of a peripheral surface of the display panel (P1) is sealed by the dam jig (13) to prevent flowing and diffusion of the adhesive applied to the display panel (P1), and a non-sealed portion (34) is exposed in a peripheral part of the display panel (P1) not in contact with the dam jig (13), and
in the step of removing bubbles, the non-sealed portion (34) is placed at an inclination upper end of the display panel (P1), and bubbles generated on the attachment surface are discharged from the non-sealed portion (34).

17. The attachment method of the display panel according to claim 16, wherein
a plurality of vacuum chamber units (3) is arranged in a rotation table (1), and a preparation stage on which the display panel (P1) and the object to be attached (P2) are supplied to the vacuum chamber unit (3), an attachment body after attachment is ejected from the vacuum chamber unit (3), and the adhesive is applied to the display panel (P1) is provided in the vicinity of the rotation table (1),
the vacuum chamber units (3) are placed on the preparation stage one by one by forward rotating the rotation table (1) by a predetermined angle and further reversely rotating the rotation table (1) by the rotation angle at the time of forward rotation, and the vacuum chamber unit (3) not placed on the preparation stage is brought into an inclined posture by the chamber inclination device, and bubbles generated on the attachment surface are removed.

\* \* \* \* \*